United States Patent [19]
Lai

[11] Patent Number: 5,901,935
[45] Date of Patent: May 11, 1999

[54] HEIGHT-ADJUSTABLE AUXILIARY JACK

[76] Inventor: Chen-I Lai, 7th Fl., No. 141, Hsing-an St., Taipei, Taiwan

[21] Appl. No.: 08/951,846

[22] Filed: Oct. 17, 1997

[51] Int. Cl.$^6$ ....................................................... A47F 5/00
[52] U.S. Cl. ................................. 248/354.1; 248/354.4; 248/544
[58] Field of Search ................................ 248/354.1, 354.4, 248/354.3, 354.5, 544, 150, 407, 423, 188.2, 561, 528, 529, 136, 165, 166, 152, 446, 649; 211/85; 52/126.3, 126.6, DIG. 11; 254/93 H

[56] References Cited

U.S. PATENT DOCUMENTS

| | | | |
|---|---|---|---|
| 2,436,499 | 2/1948 | Williams | 248/354.5 |
| 3,178,146 | 4/1965 | Goodale | 248/407 |
| 4,345,734 | 8/1982 | Suddinger | 248/354.5 |
| 4,690,361 | 9/1987 | Lundman | 248/354.5 |
| 5,520,360 | 5/1996 | Wensman | 248/354.5 |

*Primary Examiner*—Leslie A. Braun
*Assistant Examiner*—Willie Berry, Jr.
*Attorney, Agent, or Firm*—Hedman, Gibson & Costigan, P.C.

[57] ABSTRACT an auxiliary jack including a foldable base assembly and a bracket pivotably connected to the base assembly. The bracket has a sleeve for guidingly receiving an elevator. A protruding height of the elevator with respect to the sleeve is adjustable and a locking pin passes through the adjusted elevator and the sleeve to maintain the adjusted relative position.

3 Claims, 5 Drawing Sheets

HEIGHT-ADJUSTABLE AUXILIARY JACK

BACKGROUND OF THE INVENTION

The present invention relates to support devices, and more particularly to adjustable support devices such as jacks or jack stands for supporting lifted vehicles.

There are quite a few known types of hydraulic jack mechanisms for lifting heavy objects, such as motor vehicles off the ground. However, many of such jacks are so large and heavy as to not be easily portable.

Jacks provided as original equipment with motor vehicles are of light weight and can be conveniently stored in a rear deck or trunk compartment of a motor vehicle yet they are not sufficiently strong for long term use.

Both types of jacks are not suitable for long-term and convenient support of a motor vehicle so that there exists a need to employ an auxiliary jack to supplement deficiencies thereof.

BRIEF SUMMARY OF THE INVENTION

One object of the present invention is to provide an auxiliary jack comprising a bracket pivotably connected to a foldable base assembly, the bracket having a sleeve for receiving an elevator adjustable as to its protruding height with respect to the bracket via a locking pin passing through both the sleeve and the elevator. The auxiliary jack is sturdy in use and convenient for storage.

According to a feature of the invention, the base assembly consists of a pair of support frames in mesh with each other and each pivotably connected to the bracket and a pair of interconnected first and second linkages pivotably connected between the pair of support frames, the interconnected first and second linkages being operable between an extended position and a folded position.

Other objects, advantages and novel features of the invention will become more apparent from the following detailed description when taken in conjunction with the accompanying drawings.

DETAILED DESCRIPTION OF THE INVENTION

Figure 1:
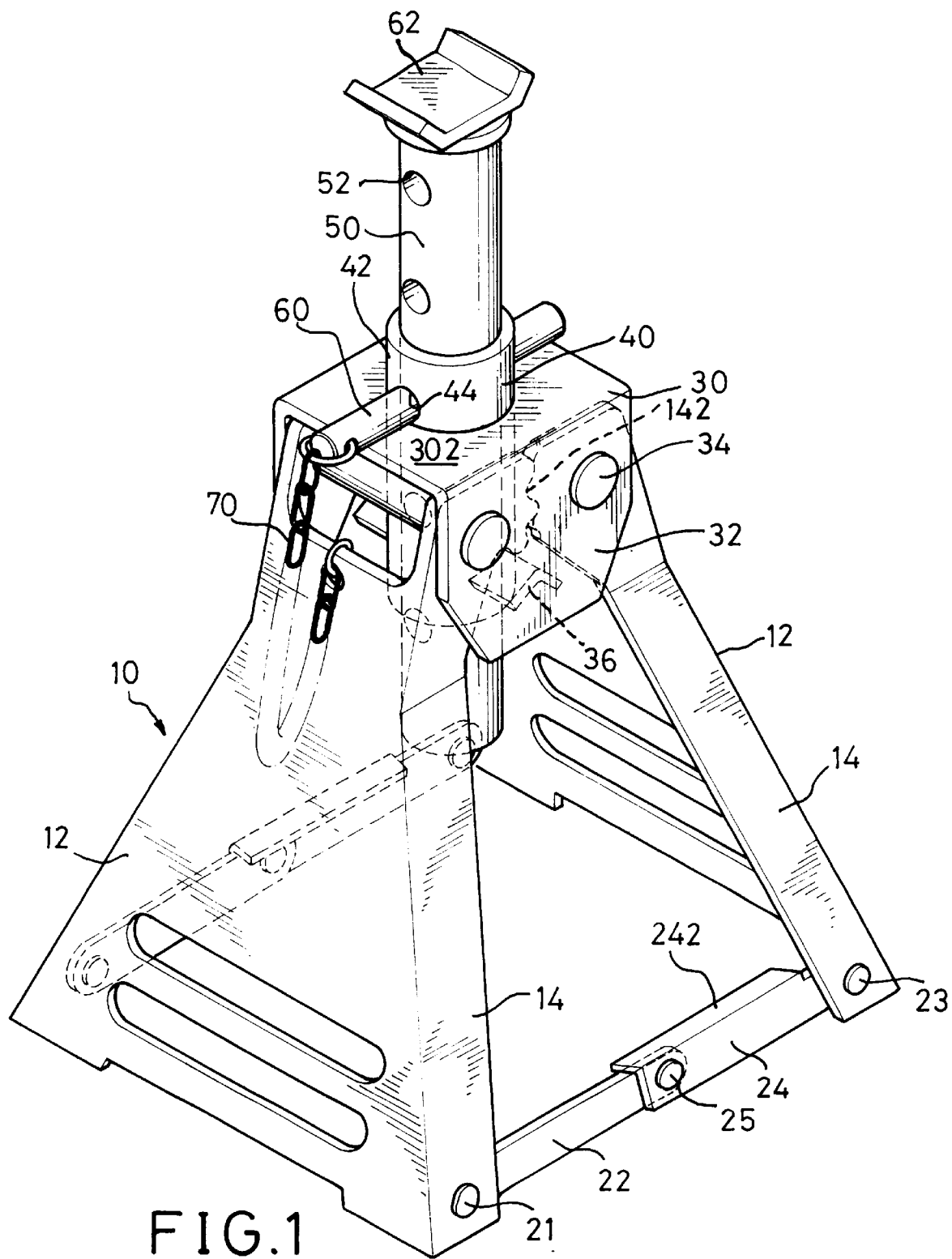
FIG. 1 is a perspective view of an auxiliary jack in accordance with the present invention.
Figure 2:
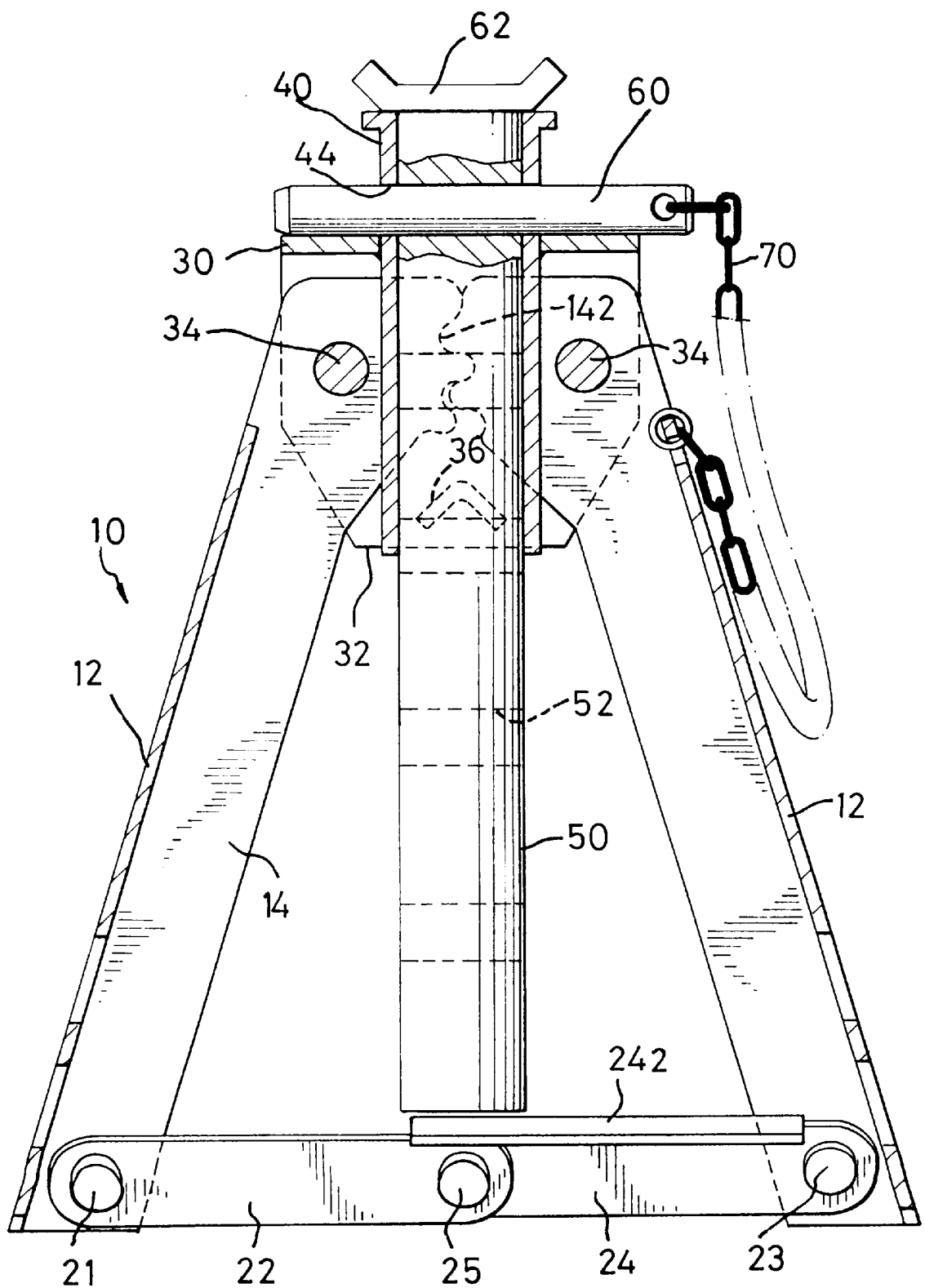
FIG. 2 is a side cross-section of the auxiliary jack.
Figure 3:
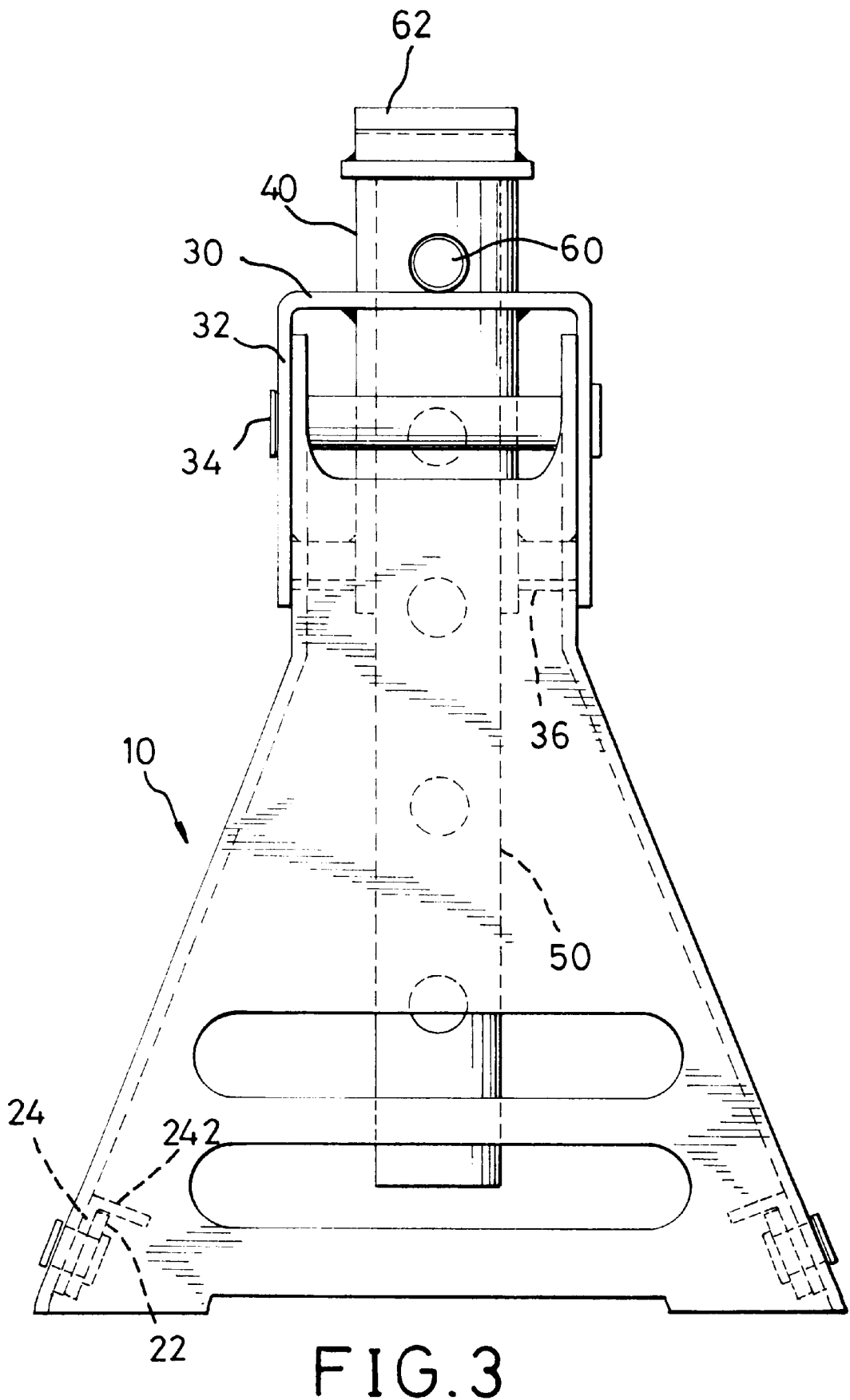
FIG. 3 is a side view of the auxiliary jack.

Referring to the drawings and initially to FIGS. 1–3, an auxiliary jack of the invention is shown to comprise substantially a base assembly 10, a bracket 30, an elevator 50 and a locking pin 60.

The base assembly 10 is constructed of a pair of support frames 12 and a pair of interconnected first and second linkages 22 and 24 pivotably connected between the pair of support frames 12 by pivots 21 and 23. The first and second linkages 22 and 24 are interconnected by a pivot 25. The linkage 24 is angled to form a lateral extension 242 so that the first and second linkages 22 and 24 can only be pivoted in one direction but not in another direction. The bracket 30 is substantially shaped as an inverted U to form a pair of downwardly depending skirts 32 to which the pair of support frames 12 are pivotally connected by means of suitable bolts 34. This is achieved by forming a pair of extensions 14 approximately in planes where the skirts 32 lie respectively. To provide a more stable supporting structure, the support frame 12 is slightly widened toward its bottom. Advantageously, each support frame 12 has a respective toothed portion 142 at the extension 14 near the bracket 30. The bracket 30, the pair of support frames 12 and the linkages 22 and 24 therefore form a structure which can be extended (cf. FIGS. 1–4) and folded (cf. FIG. 5) by manipulating the interconnected first and second linkages 22 and 24 between an extended position and a folded position, respectively.

The bracket 30 has a sleeve 40 fixedly secured thereto, for example by welding. For the purpose of firmly securing, a respective reinforcement block 36 positioned between and welded to the skirt 32 and the sleeve 40 may be provided. As can be seen, the sleeve 40 has an upper portion 42 extending above a top face 302 of the bracket 30. A passage 44 laterally extends through the upper portion 42. Preferably, the passage 44 is situated right above the top face 302 of the bracket 30.

The elevator 50 is slidably received in the sleeve 40 and has a plurality of holes 52 along a length thereof. The size of the holes 52 corresponds to that of the passage 44. The locking pin 60 can be inserted into the passage 44 of the sleeve 40, through a selected one of the plurality of holes 52 of the elevator 50, to adjust a height at which the elevator 50 projects out relative to the bracket 30. As is desired, a platform 62 may be suitably provided on top of the elevator 50 to better adapt to the contour of object or vehicle (not shown) being supported.

Figure 4:
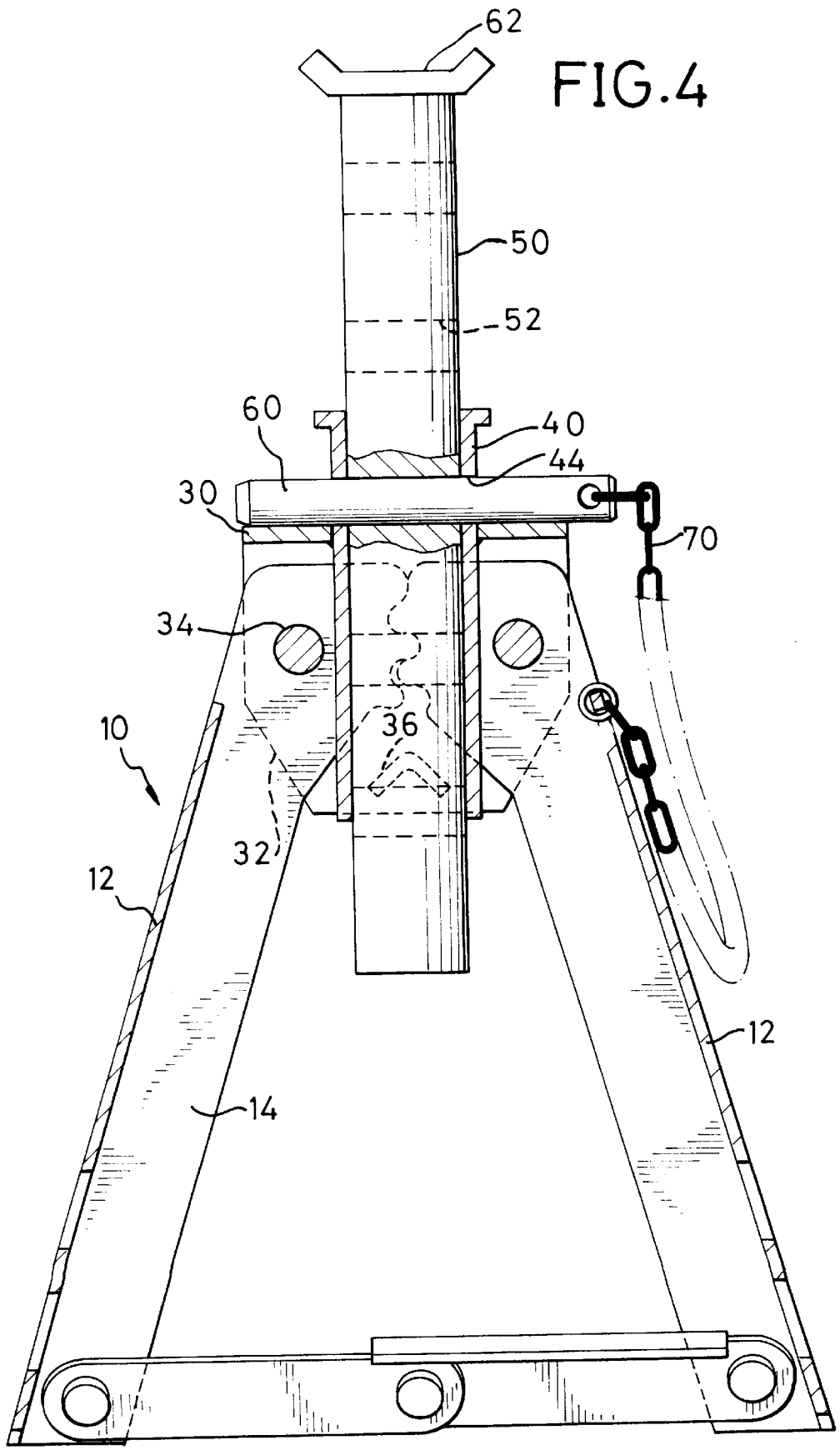
FIG. 4 is a view similar to FIG. 2 but showing an elevator in an extended position.

FIG. 4 shows the elevator is adjusted to project out a desired height from the position shown in FIG. 3. This is achieved by simply pulling out the locking pin 60 from the passage 44 and hole 52 and then re-inserting it into the passage 44 and another hole 52 while manually raising the elevator 50 under no load. The adjusted elevator 50 is now ready to support an object or vehicle.

Figure 5:
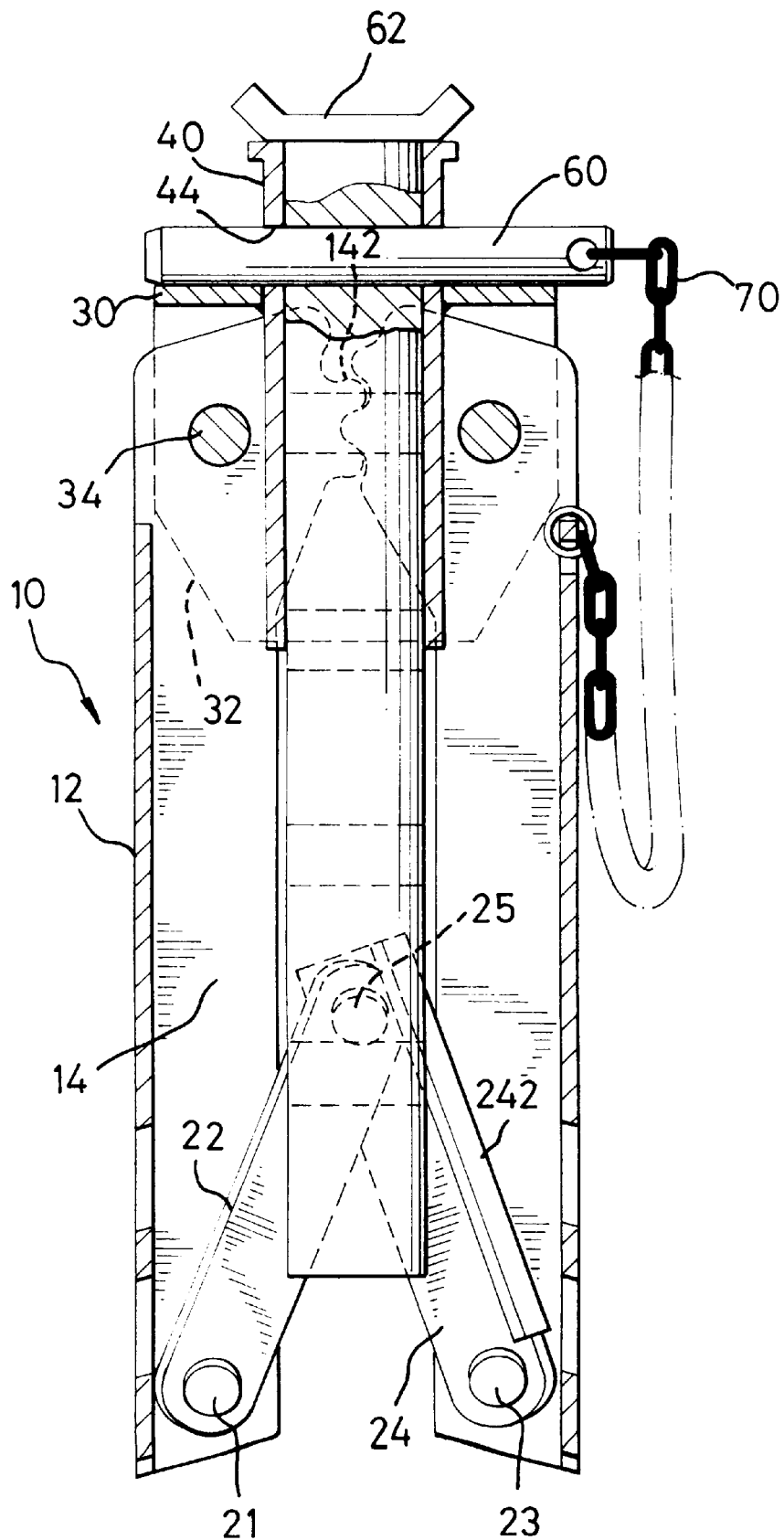
FIG. 5 is a view similar to FIG. 2 but showing the auxiliary jack in a folded or stored position.

FIG. 5 shows the first and second linkages 22 and 24 are pivoted to move the pair of support frames 12 toward each other, thus decreasing the space the auxiliary jack occupies for storage purpose. Also, to prevent the locking pin 60 from being inadvertently lost, a chain 70 may be provided to link the locking pin 60 to the support frame 12.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An auxiliary jack comprising:

a bracket having a sleeve fixedly secured thereto, the sleeve having an upper portion extending above the bracket and a passage laterally extending through the upper portion;

a pair of support frames in mesh with each other and each pivotally connected to the bracket and having a toothed portion, wherein the toothed portions on the pair of support frames are in mesh with each other;

a pair of interconnected first and second linkages pivotably connected between the pair of support frames, the interconnected first and second linkages being operable between an extended position and a folded position;

an elevator movably received in the sleeve and having a plurality of holes along a length thereof; and a locking pin inserted into the passage of the sleeve and a selected one of the plurality of holes on the elevator.

2. The auxiliary jack as claimed in claim 1, wherein the bracket comprises a pair of downwardly extending skirts and the pair of support frames are each pivotably connected between the pair of downwardly extending skirts.

3. The auxiliary jack as claimed in claim 2, in which a respective bolt is provided to extend through the pair of downwardly extending skirts and one of the pair of support frames.

* * * * *